United States Patent [19]
Parulski et al.

[11] Patent Number: 6,122,526
[45] Date of Patent: *Sep. 19, 2000

[54] CELLULAR TELEPHONE AND ELECTRONIC CAMERA SYSTEM WITH PROGRAMMABLE TRANSMISSION CAPABILITY

[75] Inventors: Kenneth A. Parulski, Rochester; James R. Schueckler, Leroy, both of N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/232,594

[22] Filed: Jan. 19, 1999

Related U.S. Application Data

[63] Continuation of application No. 08/842,458, Apr. 24, 1997.

[51] Int. Cl.[7] .................................................. H04Q 7/20
[52] U.S. Cl. .............................................. 455/556; 348/12
[58] Field of Search .................................. 348/6, 7, 8, 10, 348/12, 13, 14, 15, 211–214; 354/442, 375

[56] References Cited

U.S. PATENT DOCUMENTS

| | | |
|---|---|---|
| 5,414,444 | 5/1995 | Britz . |
| 5,712,679 | 1/1998 | Coles . |
| 5,893,037 | 4/1999 | Reele et al. ............................. 455/556 |
| 5,900,947 | 5/1999 | Kinmochi et al. ...................... 358/442 |

*Primary Examiner*—Nathan Flynn
*Attorney, Agent, or Firm*—Pamela R. Crocker

[57] ABSTRACT

An electronic camera system includes a programmable transmission capability for selectively transmitting electronic image data to a plurality of remote base units. In one embodiment, a camera module is detachably coupled to a portable computer including a display screen and a data entry device. The electronic image data generated by the camera module is supplied to the portable computer for display on the display screen. The data entry device is used by an operator to select which of the plurality of base units are to receive the digital image data. The digital image data is supplied by the portable computer to a radio-frequency transmitter module for transmission to the selected base units. The radio-frequency transmitter module is formed either integral with the portable computer or, like the camera module, is detachably coupled to the portable computer. In a further embodiment, a combined telephone/camera unit is provided that includes a camera module for generating electronic image data representative of a scene to be imaged, a memory unit for storing the electronic image data generated by the camera module, a display screen for displaying the electronic image data stored in the memory unit, a mechanism for selecting which of the plurality of base units is to receive the digital image data, and a cellular transceiver for transmitting the digital image data to the base units selected by the selection mechanism.

7 Claims, 7 Drawing Sheets

CELLULAR TELEPHONE AND ELECTRONIC CAMERA SYSTEM WITH PROGRAMMABLE TRANSMISSION CAPABILITY

CROSS-REFERENCE TO RELATED APPLICATIONS

This is a continuation of application Serial No. 08/842,458, filed Apr. 24, 1997.

FIELD OF THE INVENTION

The invention is directed to an electronic camera system. More specifically, the invention is directed to an electronic camera system that includes a transmission mechanism for sending image data to selected receiver units.

BACKGROUND

Motion video cameras and electronic still cameras have been utilized for several years in applications involving image data transmission. Electronic image data generated from a video camera, for example, can be transmitted by a conventional broadcast television station and received by any television in the broadcast area tuned to the appropriate channel. It is not possible, however, for the transmitter to select which receivers will obtain the image data, as selection is controlled at the receiver. Image data from electronic still cameras has been transmitted via conventional telephone lines to selected receivers through the use of a computer equipped with a modem. The image data must first be downloaded from the electronic still camera to the computer, which then transmits the image data to a second modem equipped computer via the telephone line where it can be viewed or printed. Unfortunately, the requirement for a telephone line to transmit image data does not allow images to be quickly and easily transmitted from remote field locations to receiver units. While systems have been proposed that utilize radio frequency transmission to transmit image data from an electronic camera to an individual base unit, none of these systems have the capability of selectively transmitting image data to a plurality of receiver units.

In view of the above, it is an object of the invention to provide an electronic camera system that includes a programmable transmission capability for selectively transmitting electronic image data to a plurality of remote receive units.

SUMMARY OF THE INVENTION

The invention provides an electronic camera system that includes a programmable transmission capability for selectively transmitting electronic image data to a plurality of remote receiver units. In one preferred embodiment of the invention, a camera module is detachably coupled to a portable computer including a display screen and a data entry device. The camera module includes an electronic image sensor for generating digital image data representative of a scene to be imaged. The electronic image data generated by the camera module is supplied to the portable computer for display on the display screen. The data entry device is used by an operator to select which of the plurality of base units are to receive the digital image data. The digital image data is supplied by the portable computer to a radio-frequency transmitter module for transmission to the selected receiver units. The radio-frequency transmitter module is formed either integral with the portable computer or, like the camera module, is detachably coupled to the portable computer. In a further preferred embodiment, a combined telephone/camera unit is provided that includes a camera module for generating electronic image data representative of a scene to be imaged, a memory unit for storing the electronic image data generated by the camera module, a display screen for displaying the electronic image data stored in the memory unit, a mechanism for selecting which of the plurality of receiver units is to receive the digital image data, and a cellular transceiver for transmitting the digital image data to the receiver units selected by the selection mechanism.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

Figures 1, 2, 3:
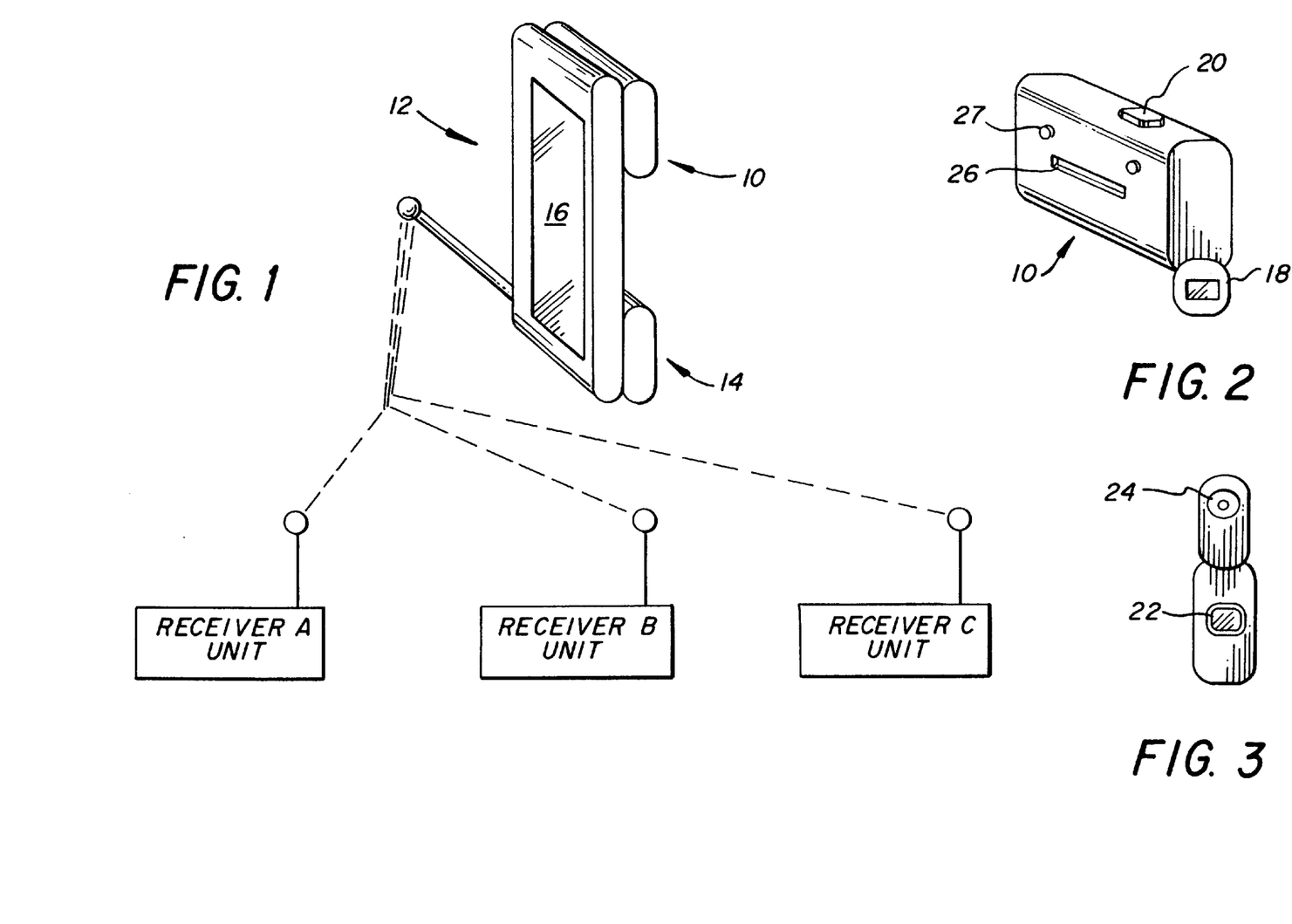
FIG. 1 is a diagram of a camera system in accordance with a first embodiment of the invention.
FIG. 2 is a perspective side view of a camera module utilized in the camera system illustrated in FIG. 1.
FIG. 3 is a front view of the camera module illustrated in FIG. 2.

A diagram of a camera system in accordance with a first embodiment of the invention is illustrated in FIG. 1. The camera system includes a "clip-on" electronic camera module 10 coupled to a pen-based computer 12 that includes a radio frequency (RF) transmitter module 14 including an antenna. The camera module 10 can be of a form described in copending and commonly assigned U.S. patent application Ser. No. 07/988,517 entitled "Electronic Camera with Memory Card Interface to a Computer", which describes a removable camera module that fits into and interfaces with a standard PCMCIA card interface slot of a pen-based computer, or of a type described in copending and commonly assigned U.S. patent application Ser. No. 07/988,560 entitled "Electronic Camera Incorporating a Computer-Compatible Bus Interface", which describes a removable camera module that interfaces directly to a standard personal computer compatible bus. The camera module 10 takes still images that can be displayed on an interactive display screen 16 of the pen-based computer 12. The RF transmitter module 14 can either be a clip-on unit, like the camera module 10, or constructed integrally with the pen-based computer 12. The interactive display screen 16 acts as an input device to the pen-based computer 12, where a stylus or "pen" is used to select various icons or "buttons" displayed on the display screen 16 to enter data or commands into the pen-based computer 12. Still images captured by the camera module 10 are transmitted from the pen-based computer 12 to one or more receiver units, labeled A, B and C in FIG. 1, via the RF transmitter module 14. The still images can be displayed, printed, manipulated or stored at the receiver units A–C.

Figure 4:
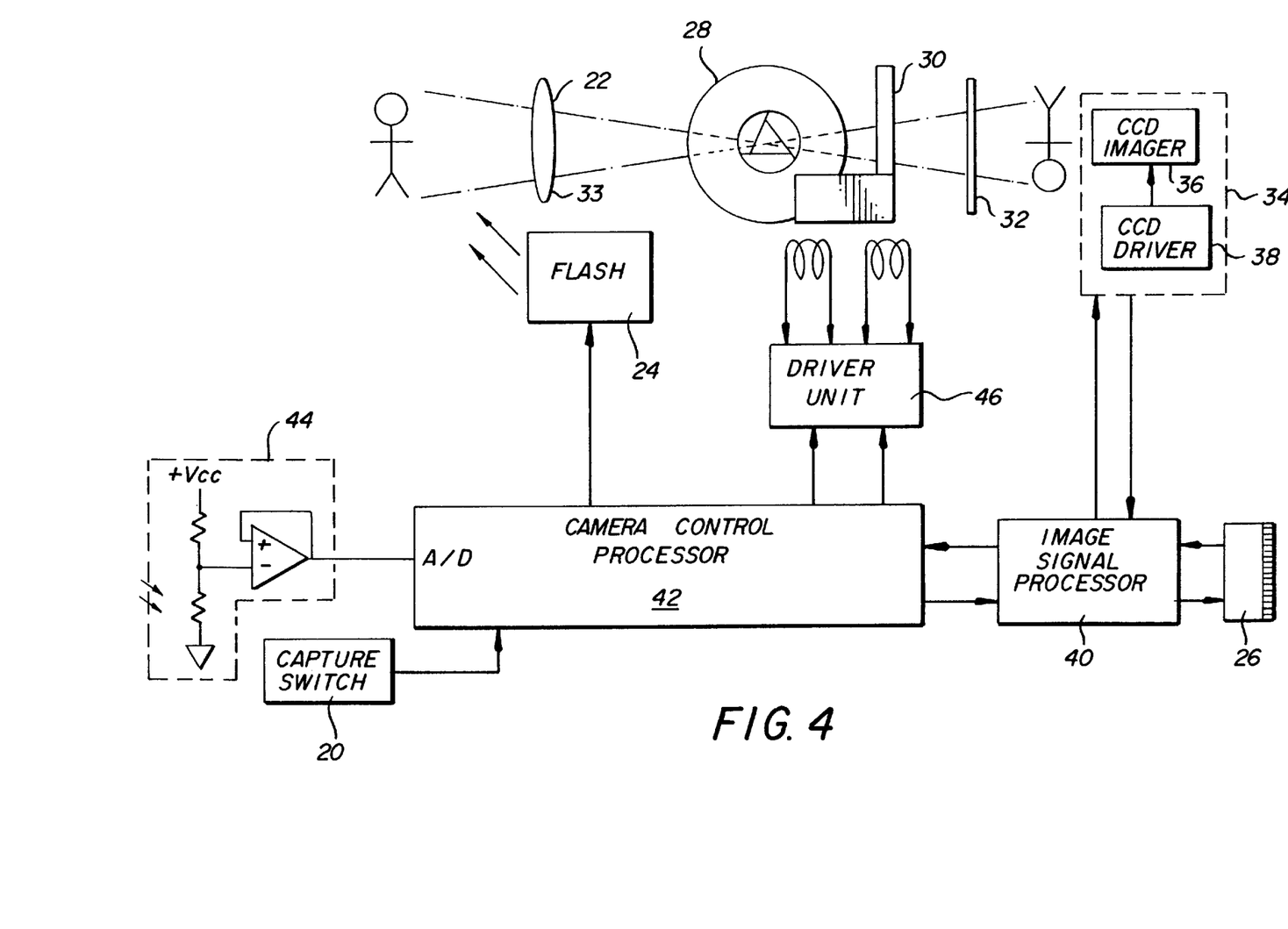
FIG. 4 is a schematic block diagram of the components of the camera module illustrated in FIG. 2.

The camera module 10 is shown in greater detail in FIGS. 2 and 3 as preferably including a slide-out optical veiwfinder 18, a capture switch 20 for initiating an image capture operation, a lens 22, a flip-out flash unit 24 that protects the lens 22 when the camera module 10 is not in use, and a computer bus connector 26 that connects the camera module 10 to either the internal bus of the pen-based computer 12 or to an interface port (such as a PCMCIA slot) of the pen-based computer 12. Mounting clips 27 are provided to aid in securing the camera module 10 to the pen-based computer 12. As shown in FIG. 4, which illustrates a schematic block diagram of the internal components of the camera module 10, scene light passes through the lens 22, an adjustable aperture 28, a shutter mechanism 30 and a filter 32 to an electronic imaging unit 34. The electronic imaging unit 34 includes a charge coupled device (CCD) electronic imaging sensor 36, for example an Eastman Kodak KAF-400, driven by a CCD driver unit 38. The electronic imaging unit 34 is coupled to an image signal processor 40 that processes an analog image signal generated by the electronic imaging sensor 36 into digital image data, and supplies the digital image data to the computer bus connector 26. Specifically, the analog image signal is supplied to a gain stage, a correlated double sampling (CDS) circuit and then an analog-to-digital (A/D) converter which are not specifically illustrated in the diagram. The digitized output signal from the A/D converter is processed via an EPROM lookup table which performs gamma correction and white balancing. The overall operation of the camera module 10 is controlled by a camera control processor 42 that includes either a general purpose microprocessor or discrete circuit elements, which receives inputs from a light measuring unit 44 and the capture switch 20, and controls the operation of the flash 24, the signal processor 40, and a driver unit 46 that controls the operation of the aperture 28 and shutter 30.

Figure 5:
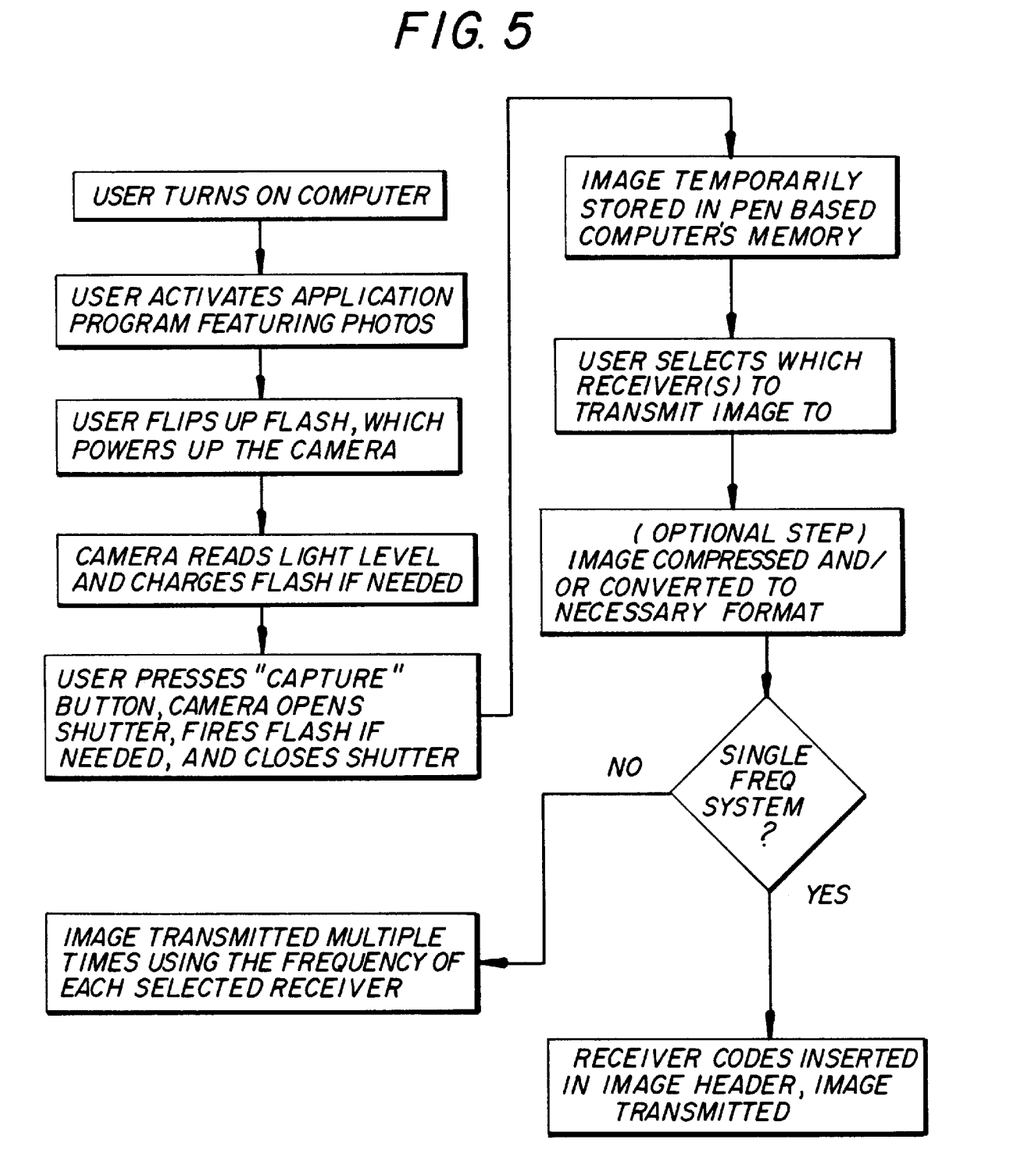
FIG. 5 is a flow diagram illustrating the operation of the camera system illustrated in FIG. 1.

The operation of the camera system is illustrated in greater detail in the flow diagram illustrated in FIG. 5. The user turns on the pen-based computer 12 using a power switch (not shown) to activate a camera application program stored in a memory unit of the pen-based computer 12, and then flips up the flash unit 24 which causes power to be supplied to the camera module 10 by activating a power switch (not shown). The user frames the subject using the optical viewfinder 18 and presses the capture switch 20 to initiate a sequence where the scene light level is read by the camera control processor 42 using the light measuring unit 44, the aperture 28 is adjusted, and the shutter 30 is opened to expose the electronic image sensor 36 to scene light. The camera control processor 42 also controls the firing of the flash unit 24 if the light measurement taken by the light measuring unit 44 indicates insufficient scene illumination. The image captured by the electronic image sensor 36 is processed by the image signal processor 40 and supplied to the pen-based computer 12 via the connector 26, where it is stored in the memory unit of the pen-based computer 12.

Figure 6:
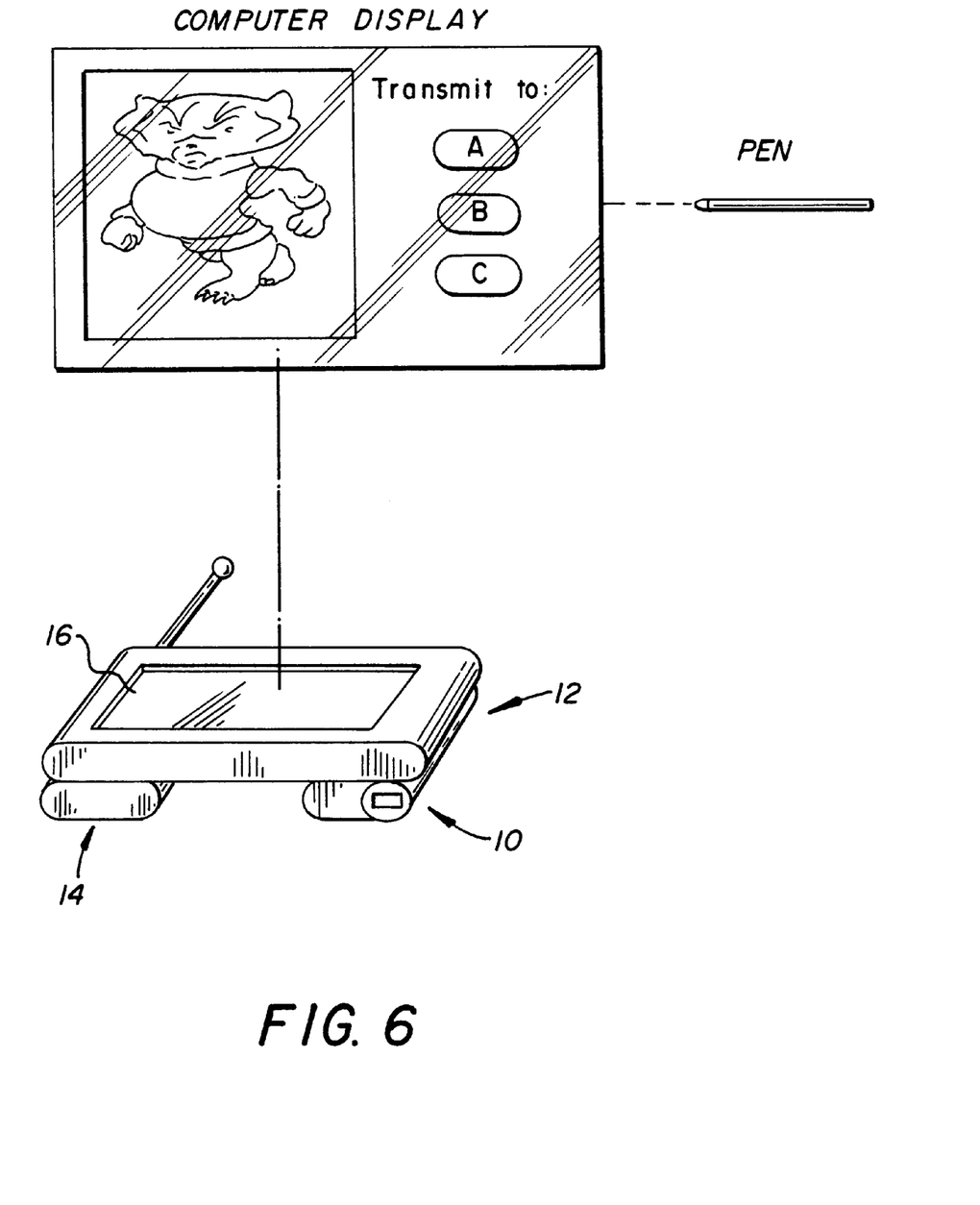
FIG. 6 illustrates the display of a captured image and a receiver unit menu selection on a display screen of the camera system illustrated in FIG. 1.

As illustrated in FIG. 6, the stored image is displayed on the display screen 16 of the pen-based computer 12 along with a transmission selection menu. The user has the option of transmitting the image to one or more of the receiver units A–C. The user selects the receiver units that are to receive the image by utilizing a pen or stylus to touch the appropriate icon displayed on the display screen 16. If appropriate, the image can be compressed, using for example JPEG compression, and converted to an appropriate format by the pen-based computer 12 prior to transmission to the receiver units A–C. After selection, the image is transmitted to the selected receiver units via the RF transmitter module 14.

The RF transmission link between the RF transmitter module 14 and the receiver units A–C may be a single frequency system including a cellular system, that uses the same frequency for all receivers, or a multiple frequency system, that uses different frequencies for each of the different receiver units A–C. In the latter case, the image is transmitted multiple times, once using the appropriate frequency band for each selected receiver unit. For single frequency systems, a header code is transmitted prior to transmitting the image. The header includes an ID for each receiver that is to receive the image. In a simple case, a three bit digital code is transmitted, where the first bit is 1 if receiver unit A should receive the image and 0 if it should not, the second bit is 1 if receiver unit B should receive the image and 0 if is should not, and the third bit is 1 if receiver unit C should receive the image and 0 if not. Alternatively, each receiver unit A–C could be assigned a specific address, and the header would contain the address of each receiver that should receive the image.

Figures 7, 8:
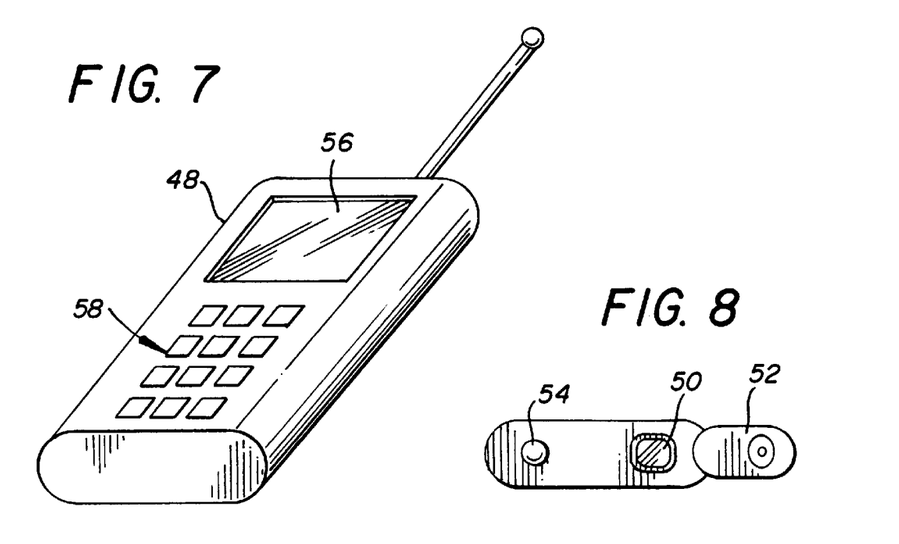
FIG. 7 is a perspective front view of a combined telephone/camera unit in accordance with a second embodiment of the invention.
FIG. 8 is a top view of the combined telephone/camera unit illustrated in FIG. 7.
Figure 9:
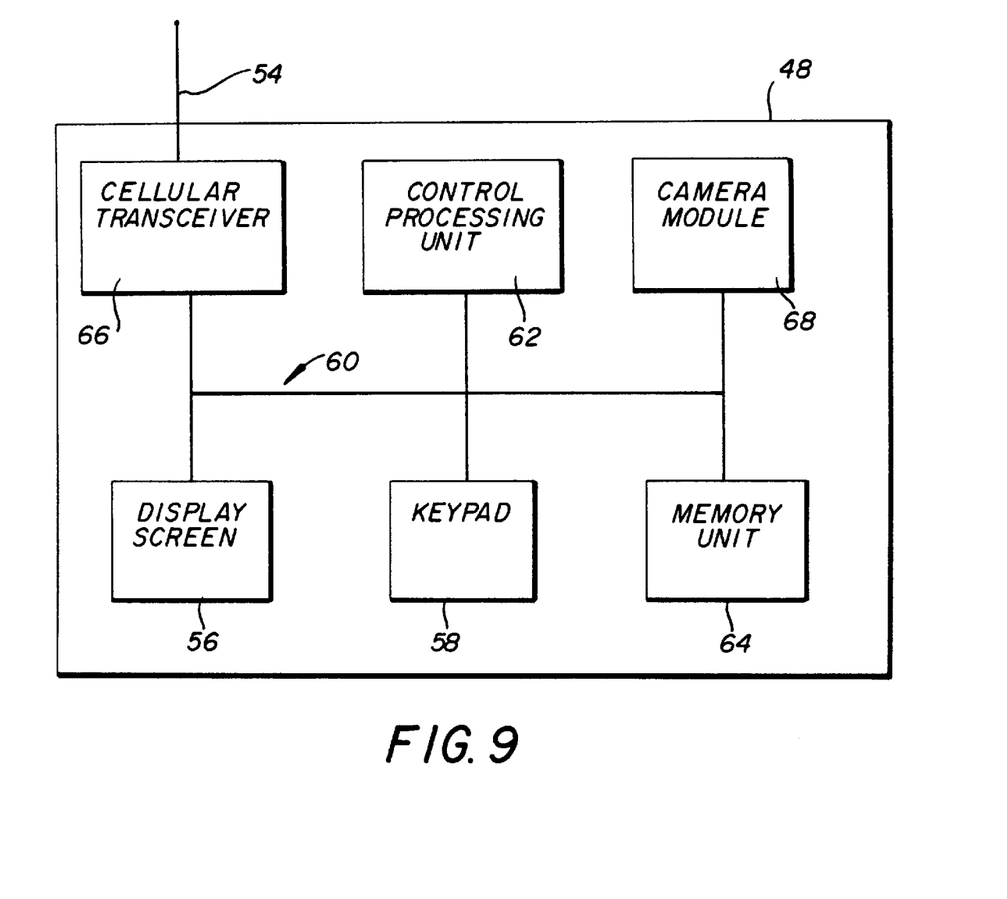
FIG. 9 is a schematic block diagram of the combined telephone/camera unit illustrated in FIG. 8.

A second embodiment of the invention is illustrated in FIGS. 7 and 8. In this embodiment, a cellular telephone is provided with the components of an electronic image camera to form a combined telephone/camera unit 48. The top of the combined unit 48 includes a lens 50, a flip-up flash unit 52, and an antenna 54. The front face of the combined unit 48 is provided with a liquid crystal display screen 56 and a telephone keypad 58, both of which are coupled to an internal bus 60 along with a control processing unit 62, memory unit 64, and cellular transceiver 66 as shown in FIG. 9. The internal bus 60 is also connected to a camera module 68, which includes the same basic components as illustrated in FIG. 4, with the exception that the output from the image signal processor is supplied directly to the internal bus 60 instead of a connector.

Figure 10:
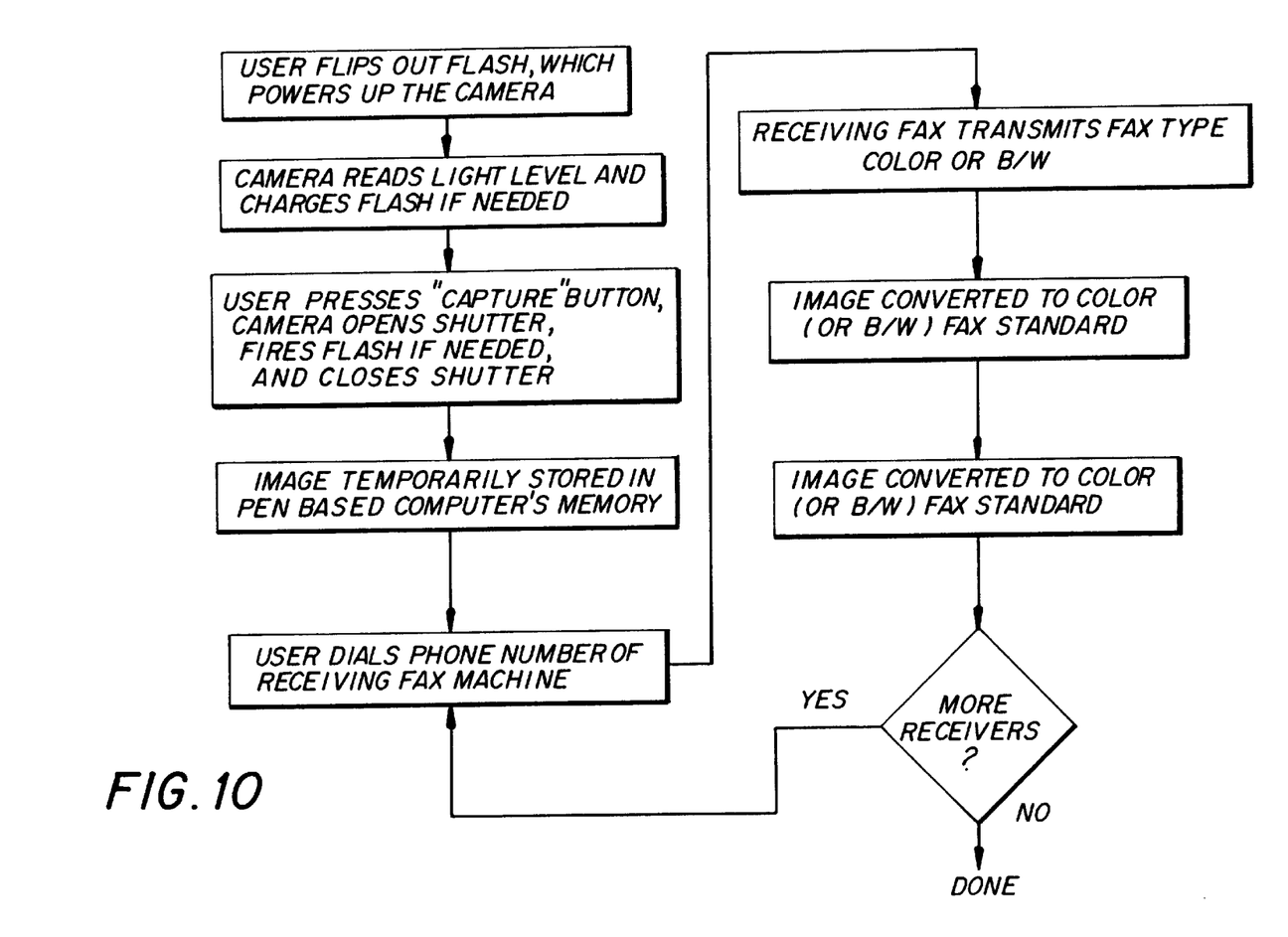
FIG. 10 is a flow diagram illustrating the operation of the combined unit illustrated in FIG. 7.
Figure 11:
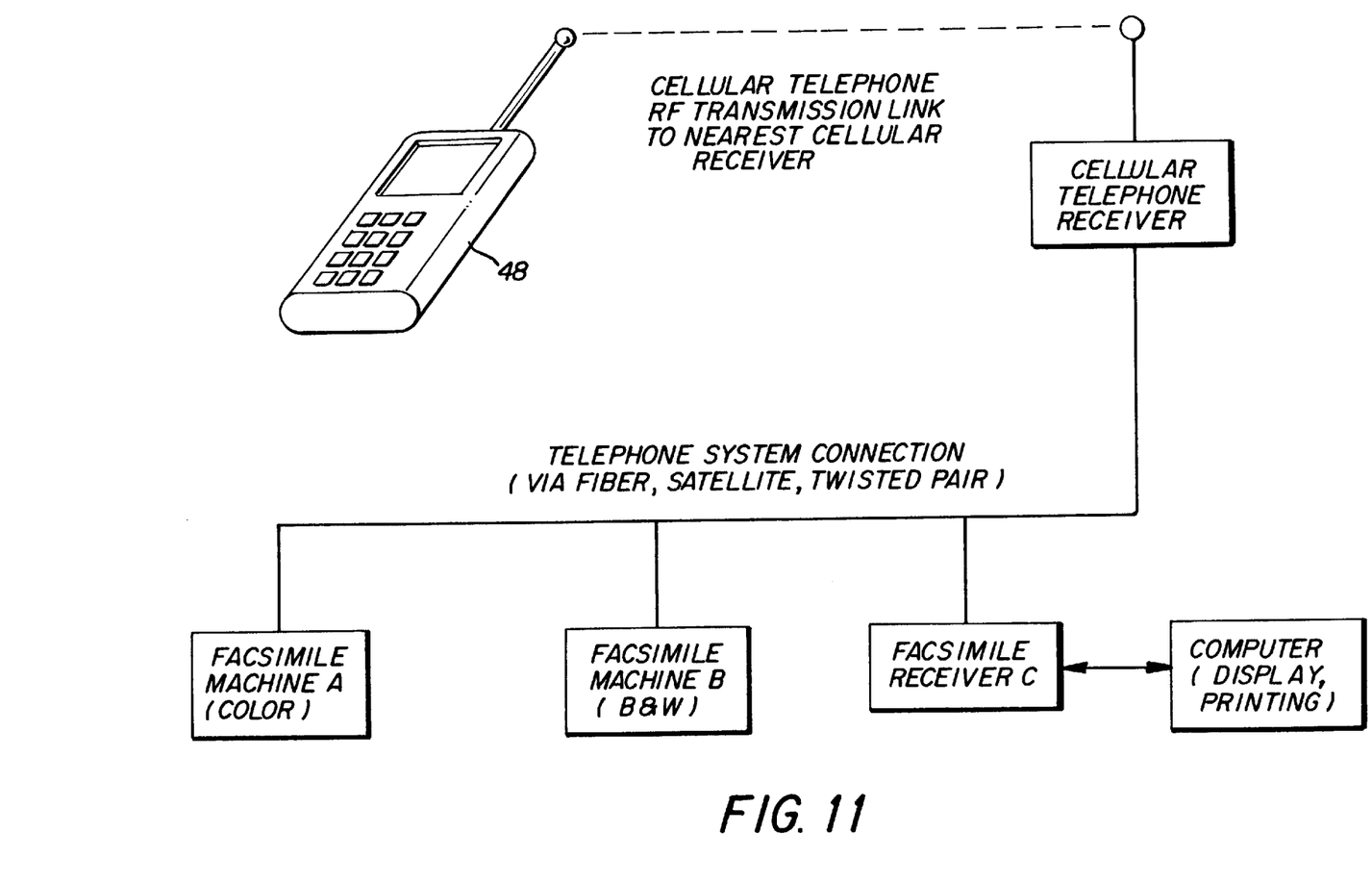
FIG. 11 is a diagram illustrating the transmission of image data to a base unit utilizing the combined unit illustrated in FIG. 7.

In operation, as illustrated in greater detail by the flow diagram illustrated in FIG. 10, the user takes a picture by flipping up the flash unit 52 and pressing an image capture switch (not shown). Alternatively, a key (for example the # key) on the keypad 58 can be utilized as the image capture switch in an image capture mode of operation. The digitize picture data generated by the camera module 68 is stored in the memory unit 64 and displayed on the display screen 56. To transmit the image, the user dials the telephone number of a desired fax machine that is to receive the image using the keypad 58. The number is transmitted to the fax machine via the cellular transceiver 66. The fax machine responds back to the combined unit 48 with the type of fax mode it is capable of receiving, for example group IV fax, color fax, etc. The stored image is then converted to the appropriate fax standard by the control processing unit 62, and is transmitted to the receiving fax machine using the normal cellular telephone system that includes an RF link from the cellular transceiver 66 to a cellular base unit, which connects to the normal wire, fiber, and satellite telephone system as shown in FIG. 11. Once the image transmission is complete, the image can be transmitted to other fax machines by entering the desired numbers using the keypad 58. The memory unit 64 can include prestored phone numbers, to reduce the number of keystrokes needed to dial frequently used numbers, and can include memory for multiple images, so that multiple images can be transmitted to the same receiving fax machine, one after the other. In addition, the combined unit 48 may be pre-programmed so that the complete image capture and telephone dialing sequence is performed each time the image capture switch is activated.

The invention has been described with reference to certain preferred embodiments thereof. It will be understood, however, that modifications and variations are possible within the scope of the appended claims. For example, although the first illustrated embodiment utilizes a pen-based computer, other types of portable computers with non-interactive displays can be utilized. In such a case, commands and data would be entered via a keyboard, mouse or other data entry devices.

INDUSTRIAL UTILITY

The invention provides an electronic camera system that includes a programmable transmission capability for selectively transmitting electronic image data to a plurality of remote base units. The camera system is particularly suited to applications, such as news gathering operations, in which it is desirable to capture images in remote field locations and transmit the images to a base station for subsequent review, distribution or publication.

Parts List
10 Camera Module
12 Pen-based Computer
14 RF Transmitter Module
16 Display Screen
18 Optical Viewfinder
20 Capture Switch
22 Lens
24 Flash Unit
26 Computer Bus Connector
27 Mounting Clips
28 Aperture
30 Shutter Mechanism
32 Filter
34 Electronic Imaging Unit
36 Electronic Imaging Sensor
38 CCD Driver Unit
40 Image Signal Processor
42 Camera Control Processor
44 Light Measuring Unit
46 Driver Unit
48 Telephone/Camera Unit
50 Lens
52 Flash Unit
54 Antenna
56 Display Screen
58 Keypad
60 Internal Bus
62 Control Processing Unit
64 Memory Unit Parts List (cont'd)
66 Cellular Transceiver
68 Camera Module

What is claimed is:

1. A portable handheld telephone system for selectively communicating with at least one of a plurality of receiving units, comprising:

(a) a telephone keypad for selecting a particular receiving unit;

(b) an image sensor for capturing image data;

(c) a memory for storing the captured image data;

(d) a control processor responsive to an image transmission mode signal indicating a type of image transmission mode receivable by the selected receiving unit for converting the stored image data into data which can be received by the selected receiving unit; and (e) a portable transceiver/receiver including an antenna for transmitting the converted image data to the selected receiving unit in a format corresponding to the image transmission mode receivable by the selected receiving unit.

2. The portable handheld telephone system of claim 1, further including an image display for displaying the stored captured image.

3. The portable handheld telephone system of claim 1, wherein the memory can store a plurality of captured image data.

4. The portable handheld telephone system of claim 1, further including flash unit.

5. The portable handheld telephone system of claim 1, wherein the memory stores phone numbers for the receiving unit.

6. The portable handheld telephone system of claim 1 wherein the image transmission uses facsimile modes.

7. The portable handheld telephone system of claim 6, wherein the facsimile modes include Group IV facsimile and color facsimile.

\* \* \* \* \*

UNITED STATES PATENT AND TRADEMARK OFFICE
CERTIFICATE OF CORRECTION

| | | |
|---|---|---|
| PATENT NO. | : 6,122,526 | Page 1 of 1 |
| APPLICATION NO. | : 09/232594 | |
| DATED | : September 19, 2000 | |
| INVENTOR(S) | : Parulski et al. | |

It is certified that error appears in the above-identified patent and that said Letters Patent is hereby corrected as shown below:

Title Page, Item (54) title patent "CELLULAR TELEPHONE AND ELECTRONIC CAMERA SYSTEM WITH PROGRAMMABLE TRANSMISSION CAPABILITY" should read --ELECTRONIC CAMERA SYSTEM WITH PROGRAMMABLE TRANSMISSION CAPABILITY--.

Signed and Sealed this
Eighth Day of March, 2016

Michelle K. Lee
*Director of the United States Patent and Trademark Office*